T. H. BATLA AND H. J. HOLAN.
COTTON STALK CUTTER AND INSECT KILLER.
APPLICATION FILED OCT. 31, 1921.
1,427,931.
Patented Sept. 5, 1922.
3 SHEETS—SHEET 2.
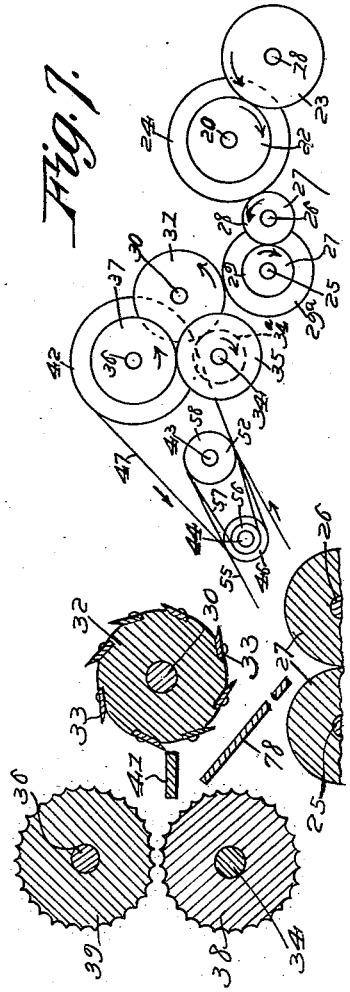
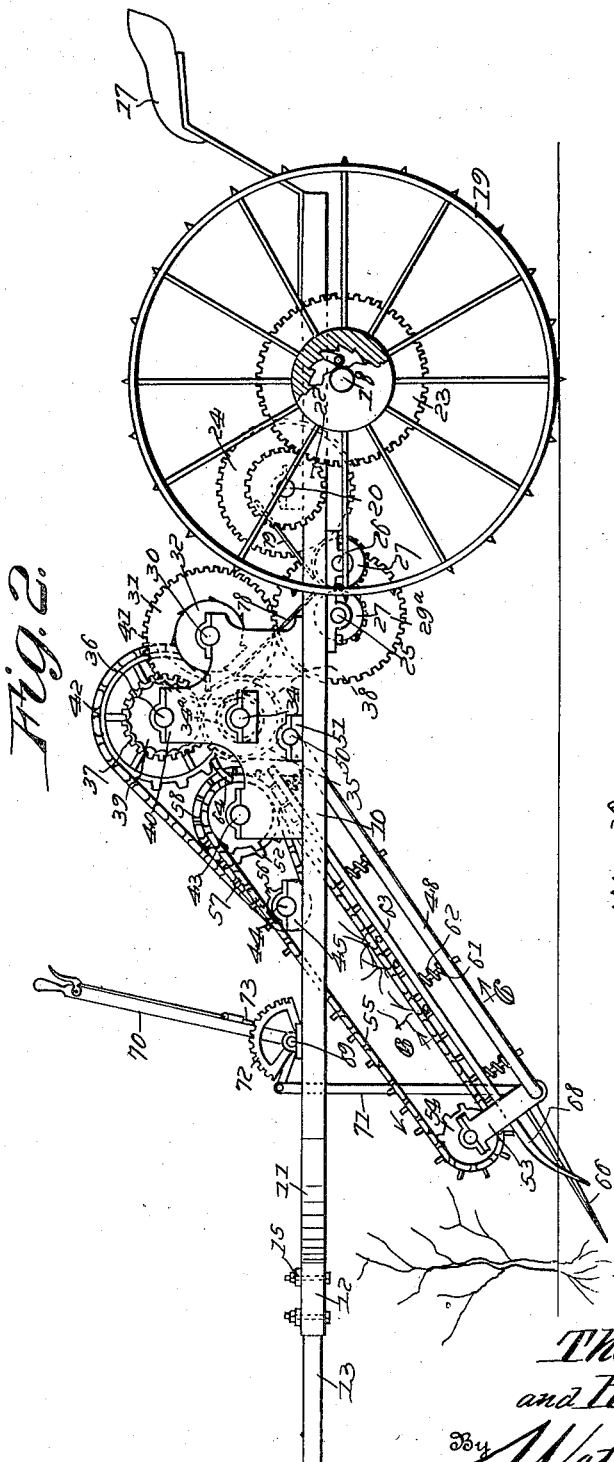
Inventors
Thomas H. Batla
and Henry J. Holan,
By Watson E. Coleman
Attorney

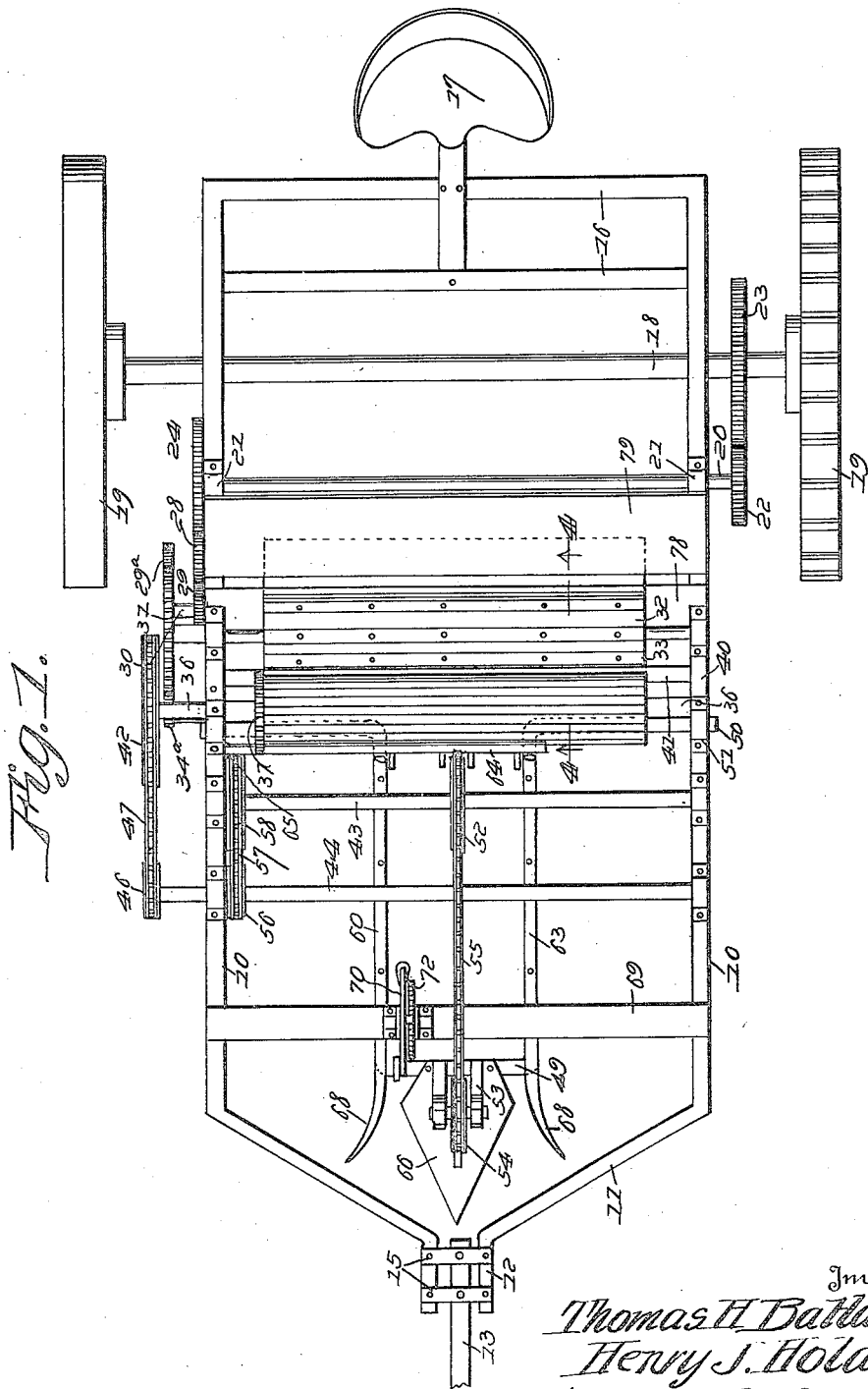

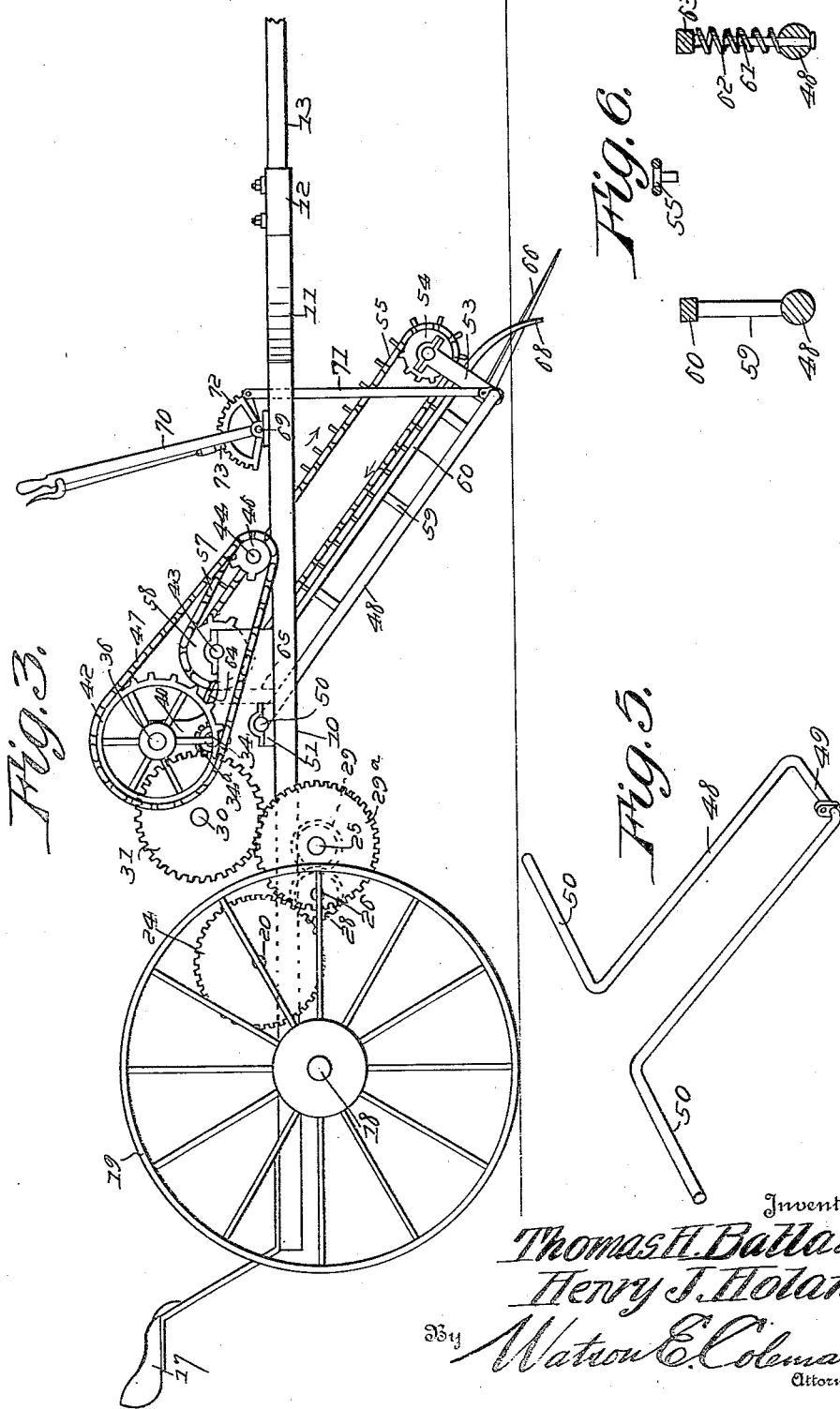

Patented Sept. 5, 1922.

1,427,931

UNITED STATES PATENT OFFICE.

THOMAS H. BATLA AND HENRY J. HOLAN, OF TEMPLE, TEXAS.

COTTON-STALK CUTTER AND INSECT KILLER.

Application filed October 31, 1921. Serial No. 511,634.

*To all whom it may concern:*

Be it known that we, THOMAS H. BATLA and HENRY J. HOLAN, citizens of the United States, residing at Temple, in the county of Bell and State of Texas, have invented certain new and useful Improvements in Cotton-Stalk Cutters and Insect Killers, of which the following is a specification, reference being had to the accompanying drawings.

This invention relates to agricultural machines, and particularly to a machine designed for the purpose of tearing up cotton stalks or like plants and so treating these stalks as to kill all insects thereon and to place the stalks in such condition that they may be discharged upon the field, the treatment acting to destroy insects which may have collected on the cotton stalk and which will be dangerous to the cotton, such as boll weevils, boll worms and other insects.

The general object of our invention is to provide a machine of this character in which provision is made for first lifting the stalks from the ground, then discharging the stalks between feeding rollers, cutting the stalks into small pieces, and then crushing the stalks so as to crush and destroy insects which may be upon these withered stalks.

A further object is to provide a machine of this character including a plow or cutter and a stalk conveyor mounted upon a supporting frame so that the stalk conveyor and plow may be raised or lowered so that the plow or cutter may cut beneath the plant and lift it bodily upward and cause it to be engaged by the conveyor.

Other objects have to do with the details of construction and arrangement of the various parts as will more fully hereinafter appear.

Our invention is illustrated in the accompanging drawings, wherein:—

Figure 1 is a top plan view of a machine of the character described;

Figure 2 is a side elevation of the same;

Figure 3 is a side elevation looking from the opposite side to that shown in Figure 2;

Figure 4 is a fragmentary sectional view through the feeding rolls, the cutting roll, and the crushing rolls;

Figure 5 is a perspective view of the plow supporting frame;

Figure 6 is a diagrammatic cross sectional view through the rails 60 and 63 and their supporting bars and showing the chain 55;

Figure 7 is a diagrammatic elevation showing the train of gears whereby power is transmitted from the axle of shaft 18 to the various rollers and to the conveyor 55;

Referring to these drawings, 10 designates the longitudinal beams of the supporting frame, these beams being convergent at their forward ends, as at 11, and then longitudinally extended to form means for the attachment of a tongue 13 whereby the implement may be drawn. The tongue is connected to the forwardly extended portions of the beams by means of transverse members 15. The rear ends of the beams 10 may be connected by transverse braces in any suitable manner and these braces 16 will support the seat 17 of any suitable construction.

Rotatably mounted in bearings at the rear end of the frame is the transverse shaft 18 carrying upon it the traction wheels 19. The traction wheels 19 are loose upon the shaft 18 but are operatively connected thereto by pawl and ratchet mechanism, such as commonly found in harvesters,, mowing machines, and other agricultural implements, whereby as the machine moves forward motion will be transmitted to the shaft 18, but if the machine should be backed, the wheels 15 will revolve without transmitting motion to the shaft 18. Inasmuch as this construction is a common and well known pawl and ratchet mechanism, it is not believed necessary to describe it in detail.

Disposed adjacent and parallel to the shaft 18 is a power transmission shaft 20 which is mounted in suitable bearings 21 on the beams 10, this shaft carrying a gear wheel 22 which meshes with a gear wheel 23 carried upon the shaft 18. Also mounted upon the shaft 20 is a gear wheel 24. Mounted in bearings on the main beams 10 are the two parallel shafts 25 and 26 carrying the smooth-faced crushing rollers 27 which have close contact with each other. The shaft 26 carries upon it the gear wheel 28 which meshes with the gear wheel 23 and also with the gear wheel 29 mounted upon the shaft 25. Also mounted on shaft 25 is a gear wheel 29$^a$.

Mounted in bearings supported on the main beams 10 is a shaft 30 parallel to but above the level of the shafts 25 and 26, this shaft 30 carrying a gear wheel 31 which meshes with the gear wheel 29ª, and on this shaft 30 is mounted a cutting roller 32 carrying longitudinally extending cutting knives 33. Mounted in a bearing upon the beams 10 and disposed parallel to the shaft 30 is a shaft 34 carrying a gear wheel 34ª which meshes with the gear wheel 31. Mounted in suitable bearings above the shaft 34 is a shaft 36 carrying at its end a gear wheel 37 which meshes with a gear wheel 35 on shaft 34. On the shaft 34 is mounted a feed roller 38, and mounted upon the shaft 36 is a feed roller 39. Preferably, though not necessarily, these rollers have their faces formed with ribs. The shaft 36 is illustrated as being mounted in upwardly extending brackets 40, and it is obvious that the shafts may be mounted in any suitable manner. Disposed between the rollers 38 and 39 and the cutting roller 32 is a stalk supporting rod 41 with which the cutters 33 coact and by which the stalk is supported as it passes from between the feed rollers 38 and 39 to the cutting roller 32. Mounted upon the shaft 36 is a sprocket wheel 42.

Disposed across the beams 10 and supported in bearings thereon is a shaft 43, and disposed parallel to this shaft 43, is a relatively short shaft 44 supported in a bracket 45, that is having its inner end supported in a bracket 45, this short shaft carrying upon it a sprocket wheel 46 connected by a sprocket chain 47 to the sprocket wheel 42. The sprocket wheel 42 rotates in a counter-clockwise direction and, therefore, the sprocket wheel 46 will rotate in a counter-clockwise direction. Mounted in bearings 51 on the frame 11 is a downwardly and forwardly extending, plow supporting frame comprising lateral beams 48 and a connecting member 49 at the lower ends of the beams. The upper ends of the beams 48 are angularly bent outward, as at 50, and oscillatably supported in the bearings 51. Thus this frame 48 is operatively pivoted on an axis so that the forward end of the frame may be raised or lowered, the chain 55 slackening as the frame is raised and tightening as it is lowered.

On the shaft 43 is mounted a sprocket wheel 52, and supported in brackets 53 on the cross bar 49 is an idler sprocket wheel 54. Extending around the sprocket wheels 54 and 52 is a conveyor chain 55 and formed preferably with hook-shaped teeth, the lower flight of this chain being disposed above the beams 48. Any suitable means may be used for driving the sprocket wheel 52 from the shaft 44. We have illustrated, however, the shaft 44 as being provided with a sprocket wheel 56, from which a sprocket chain 57 runs around a sprocket wheel 58 mounted upon the shaft 43. Thus the shaft 43 is given a counter-clockwise rotation by the counter-clockwise rotation of the shaft 44.

Mounted upon one of the beams 48 are upwardly and inwardly extending supports 59, and carried upon these supports is a longitudinally extending rail 60. Mounted on upwardly extending supports 61 extending upward and inward from the other of the beams 48 and supported by springs 62 is a rail 63 corresponding to the rail 60. These rails 60 and 63 are so disposed that they are just below the path of travel of the conveyor chain 55. These rails 60 and 63 form the supports for the stalks as they are being dragged upward by the conveyor chain 55. Mounted adjacent the rollers 38 and 39 and receiving stalks as they are delivered by the under flight of the chain 55 is a stalk guide 64 which guides the stalks into position between the feed rollers 38 and 39. This may be mounted in any suitable manner and we have illustrated it as having a shank 65 which is bolted to the side of the machine. The cross bar 49 at the forward end of the conveyor-carrying frame carries a cutter or plow 66 whose point is adapted to cut into the ground beneath the cotton stalk and lift it. The stalk is guided into position to be engaged by the chain 55 by outwardly bending divergently the ends of the rails 60 and 63, as at 68, these outwardly divergent ends being downwardly extended to form guides.

For the purpose of raising and lowering the frame supporting the plow conveyor, we mount upon the transverse cross piece 69 the angular lever 70, one arm of which is connected by a cable 71 or like connection to the free end of the frame supporting the conveyor and plow, the other arm operating over a toothed segment 72 and having the usual hand operated bolt 73 whereby it may be locked in adjusted positions on the segment.

With the construction as described, the plow cuts beneath the soil to a degree controlled by the elevation or depression of the plow and the cotton stalks are lifted and move up the plow and fall over onto the guides 68 and are carried up these guides until they are engaged by the hook-shaped lugs or teeth on the lower flight of the chain 55. These carry the stalks upward on the rails 60 and 63, as illustrated in Figure 6, and eventually the stalks are discharged upon the guide 64 and forced between the feeding rollers 42. These feeding rollers draw the stalks between them and project the stalks across the bar 41 so that the stalks are engaged by the cutter 33 and chopped into little bits. Beneath the cuttting rail 33 and extending downward over one of the crushing rollers 27 is a sheet iron plate or shield 78 and extending downward over the other crushing roller is a sheet iron plate or shield 79, these sheet iron plates constituting together a hopper causing the cut sections of stalks to be discharged between the crushing rollers 37. These rollers are placed very closely together, and as a consequence the stalks are thoroughly crushed between these rollers and all insects that may be upon the stalks or in the interior of the stalks are killed.

Thus it will be obvious that by the use of this machine the stalks of cotton may be readily torn up from the ground, cut up and crushed and the insects, grubs, cocoons, eggs, etc., on the cotton stalks killed so that they will not affect the next crop of cotton. Preferably the cutting blades on the cutting roller 32 will be detachable so as to be sharpened from time to time and these blades or cutters will be disposed around the roller 32 nearer together to cut the stalks into small pieces as the knives pass the cutting bar 41. The object in having one of the rails, as for instance the rail 63, yielding while the other rail 60 is rigid is to permit the larger stalks to pass up with the lug chain 55. It will be understood, however, that both of the rails might be spring supported if desired. The plow will be so set as to cut into the ground about four or five inches deep so as to fully detach the roots of the cotton or other stalks from the ground. It will be understood, of course, that the ratchet and pawl connection between the wheels 19 and the shaft 18 will be such as will permit one wheel to move faster than the other, as when turning a corner.

Many changes might be made in the details of construction and arrangement of the various parts without departing from the spirit of the invention.

We claim:—

1. A stalk cutter and insect killer including a supporting frame, traction wheels thereon, a stalk cutting roller having knives, a cutter bar coacting with the roller and its knives, a pair of crushing rollers, a plow supported in advance of the stalk cutting means, a conveyor carrying stalks from the plow to the stalk cutting means, and means conveying the cut stalks from the stalk cutting means to the crushing rollers, said rollers, stalk cutting means and conveyor being operatively connected to the traction wheels to be driven thereby.

2. A stalk cutter and insect killer including a traction wheel supported frame, a pair of feeding rollers mounted upon the frame, a cutting roller mounted behind the feeding rolls, a cutting bar between the feeding rollers and the cutting roller, a pair of crushing rollers mounted behind the cutting roller, a plow, a conveyor conveying stalks from the plow to the feeding rollers, means for discharging the cut stalks from the cutting roller to the crushing rollers, and means for operatively driving said rollers and the conveyor from the traction wheels.

3. A stalk cutter and insect killer including a traction wheel supported frame, upper and lower feed rollers mounted upon the frame, a cutting roller having knives disposed behind the feed rollers, a cutter bar disposed between the feed rollers and the cutting roller, a pair of horizontally disposed crushing rollers disposed beneath the cutting roller, guide plates extending over both crushing rollers and discharging between them, a plow supporting frame pivoted at its upper end to the main frame, a plow carried at the lower end of the plow supporting frame, means for raising and lowering the free end of the plow supporting frame, a conveyor onto which said plow discharges, said conveyor discharging stalks between the feed rollers, and driving means between the traction wheels, said rollers and the conveyor.

4. A stalk cutter and insect killer including a traction wheel supported frame, upper and lower feed rollers mounted upon the frame, a cutting roller having knives disposed behind the feed rollers, a cutter bar disposed between the feed rollers and the cutting roller, a pair of horizontally disposed crushing rollers disposed beneath the cutting roller, guide plates extending over both crushing rollers and discharging between them, a plow supporting frame operatively pivoted at its upper end to the main frame, a plow carried at the lower end of said supporting frame, means for raising or lowering the lower end of the supporting frame, guide rails mounted upon said supporting frame and extending upward from the plow to said feed rollers, an endless conveyor mounted upon the plow supporting frame and having its lower flight operating between and slightly above the guide rails, and traction wheel operated means for driving said rollers and the conveyor.

5. A stalk cutter and insect killer including a traction wheel supported frame, upper and lower feed rollers mounted upon the frame, a cutting roller having knives disposed behind the feed rollers, a cutter bar disposed between the feed rollers and the cutting roller, a pair of horizontally disposed crushing rollers disposed beneath the cutting roller, guide plates extending over both crushing rollers and discharging between them, a plow supporting frame operatively pivoted at its upper end to the main frame, a plow carried at the lower end of said supporting frame, means for raising or lowering the lower end of the supporting frame, guide rails mounted upon said supporting frame and extending upward from the plow to said feed rollers, one of said guide rails being resiliently supported, rollers mounted at the opposite end of the plow supporting frame and in a vertical plane and midway between the guide rails, an endless belt having stalk engaging lugs carried on the guide rails and having its lower flight disposed slightly above said guide rails, and means for driving the rollers and the endless conveyor from said traction means.

6. A stalk cutter and insect killer including a traction wheel supported frame, upper and lower feed rollers mounted upon the frame, a cutting roller having knives disposed behind the feed rollers, a cutter bar disposed between the feed rollers and the cutting roller, a pair of horizontally disposed crushing rollers disposed beneath the cutting roller, guide plates extending over both crushing rollers and discharging between them, a plow supporting frame operatively pivoted to the main frame having a cross bar at its lower end, a plow carried upon the lower end of the plow supporting frame, a sprocket wheel mounted in brackets upon the lower end of the plow supporting frame and above the same, rails mounted upon the plow supporting frame and extending upward and toward the crushing rollers, a sprocket wheel mounted upon the upper end of the plow supporting frame, an endless conveyor chain having teeth mounted upon the sprocket wheels and having its lower flight disposed immediately above and between said rails, means on the forward end of the main frame for raising or lowering the conveyor frame, a train of gears carried by the shafts of the several rollers and operatively engaging the rear axle of the machine to be driven thereby, a sprocket wheel carried upon the shaft of one of said feed rollers, and operative driving connections between said sprocket wheel and the uppermost sprocket wheel of the conveyor chain.

In testimony whereof we hereunto affix our signatures.

THOMAS H. BATLA.
HENRY J. HOLAN.